(12) United States Patent
Sato

(10) Patent No.: US 8,016,466 B2
(45) Date of Patent: Sep. 13, 2011

(54) DOOR MIRROR

(75) Inventor: Yasuhiro Sato, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 102 days.

(21) Appl. No.: 12/447,483

(22) PCT Filed: Jun. 4, 2007

(86) PCT No.: PCT/JP2007/061270
§ 371 (c)(1),
(2), (4) Date: Jun. 9, 2009

(87) PCT Pub. No.: WO2008/053611
PCT Pub. Date: May 8, 2008

(65) Prior Publication Data
US 2010/0061113 A1    Mar. 11, 2010

(30) Foreign Application Priority Data
Oct. 31, 2006    (JP) .............................. P2006-296461

(51) Int. Cl.
*B60Q 1/26* (2006.01)
(52) U.S. Cl. ........ 362/494; 362/509; 362/516; 362/519; 362/520
(58) Field of Classification Search .................. 362/487, 362/494, 509, 516–517, 520
See application file for complete search history.

(56) References Cited

U.S. PATENT DOCUMENTS
2008/0285293 A1    11/2008    Sato

FOREIGN PATENT DOCUMENTS

| CN | 1582375 A | 2/2005 |
|---|---|---|
| CN | 2723827 Y | 9/2005 |
| JP | 61-129645 | 8/1986 |
| JP | 1-302603 | 12/1989 |
| JP | 10-211846 | 8/1998 |
| JP | 11-34743 | 2/1999 |
| JP | 11-105621 | 4/1999 |
| JP | 2001-294081 | 10/2001 |
| JP | 2002-96683 | 4/2002 |
| JP | 2005-150037 | 6/2005 |
| JP | 2006-111128 | 4/2006 |
| WO | WO 2005/090857 A1 | 9/2005 |

OTHER PUBLICATIONS

Office Action issued Nov. 3, 2010, in Chinese Patent Application No. 20070030071.4.

*Primary Examiner* — Stephen F Husar
*Assistant Examiner* — Meghan K Dunwiddie
(74) *Attorney, Agent, or Firm* — Oblon, Spivak, McClelland, Maier & Neustadt, L.L.P.

(57) ABSTRACT

A reflector 30 is constituted as an aspherical mirror that forms a light distribution S1 in which spread of reflected light in a longitudinal direction of the vehicle is larger than spread of reflected light in a lateral direction of the vehicle. The light distribution expanded in the longitudinal direction of a vehicle 3 makes the light less likely to impinge on a side surface of the vehicle 3, so that the rear part of the vehicle 3 can be illuminated efficiently. As a result, maximum illumination can be achieved with the minimum amount of light. In addition, because the range of illumination is long in the longitudinal direction, not only the area around an occupant's feet outside a front door 5 but also an area around the feet outside a rear door 6 can be illuminated easily.

15 Claims, 22 Drawing Sheets

DOOR MIRROR

TECHNICAL FIELD

The present invention relates to a door mirror incorporating a lamp.

BACKGROUND ART

Examples of the technical field of such a door mirror include Japanese Patent Application Publication No. 2002-96683 and Japanese Patent Application Publication No. 2001-294081. In the known technology described in Japanese Patent Application Publication No. 2002-96683, the door mirror incorporates a lamp which illuminates an occupant's feet outside a front door. The lamp is disposed within a lamp house provided inside a door mirror body, and light is emitted from the lamp toward the occupant's feet outside the door via a lens provided in a lower part of the door mirror body.

Patent Literature 1: Japanese Patent Application Publication No. 2002-96683.

Patent Literature 2: Japanese Patent Application Publication No. 2001-294081.

DISCLOSURE OF THE INVENTION

Problem to be Solved by the Invention

However, because the lamp provided in the above-mentioned conventional door mirror radiates the light toward a part directly below the door mirror, the ground directly below the door mirror is illuminated, and the occupant's feet outside the front door cannot be illuminated sufficiently. Moreover, because the distribution of the light radiated by the lamp is normally in a circular shape, when illuminating the entire area around the occupant's feet outside the front door by means of foot lighting using the door mirror, an extremely large circular light distribution is required. However, an extremely large light distribution radiates the majority of the light to the side surface of the door and thus a place distant from the vehicle in question, and consequently the light illuminated by the lamp is wasted significantly. The problem therefore is that it is difficult to ensure illuminance sufficient for checking the area around the feet outside the door when the occupant opens the door.

An object of the present invention is to provide a door mirror that securely illuminates an area around an occupant's feet while ensuring illuminance sufficient for checking the area around the feet outside a door when the occupant opens the door.

Means for Solving the Problem

A door mirror according to the present invention, in which a lamp for illuminating an area around a foot of an occupant outside a door of a vehicle is provided within a door mirror body, has a lamp window that is provided in the door mirror body fixed to the door, and a reflector that is disposed within the door mirror body and reflects light emitted from the lamp, toward the lamp window, wherein the reflector is an aspherical mirror that has a mirror surface configured as a paraboloidal surface that forms a light distribution in which spread of reflected light in a longitudinal direction of the vehicle is larger than spread of reflected light in a lateral direction of the vehicle.

Because this door mirror has the reflector for effectively utilizing the light of the lamp, the light of the lamp can be emitted efficiently from the lamp window. Moreover, because the reflector is constituted as an aspherical mirror that has a mirror surface configured as a paraboloidal surface that forms a light distribution in which spread of reflected light in a longitudinal direction of the vehicle is larger than spread of reflected light in a lateral direction of the vehicle, the light distribution expanded in the longitudinal direction of the vehicle makes the light less likely to impinge on a side surface of the door of the vehicle, so that the rear part of the vehicle can be illuminated efficiently. As a result, maximum illumination can be achieved with the minimum amount of light. In addition, because the range of illumination is long in the longitudinal direction, not only the area around the feet outside the front door but also an area around the feet outside a rear door can be illuminated easily.

Moreover, it is preferred that a top of the mirror surface of the reflector be provided with a planar, convex, or concave secondary reflecting surface. In case of employing such configuration, the light within the light distribution can have intensity if necessary. For example, the light on the edge of the light distribution or the light in the middle of the light distribution can be intensified, or various light distributions with intensities can be obtained.

Effects of the Invention

The present invention can ensure illuminance sufficient for checking the area around the feet outside the door when the occupant opens the door.

Figure 1:
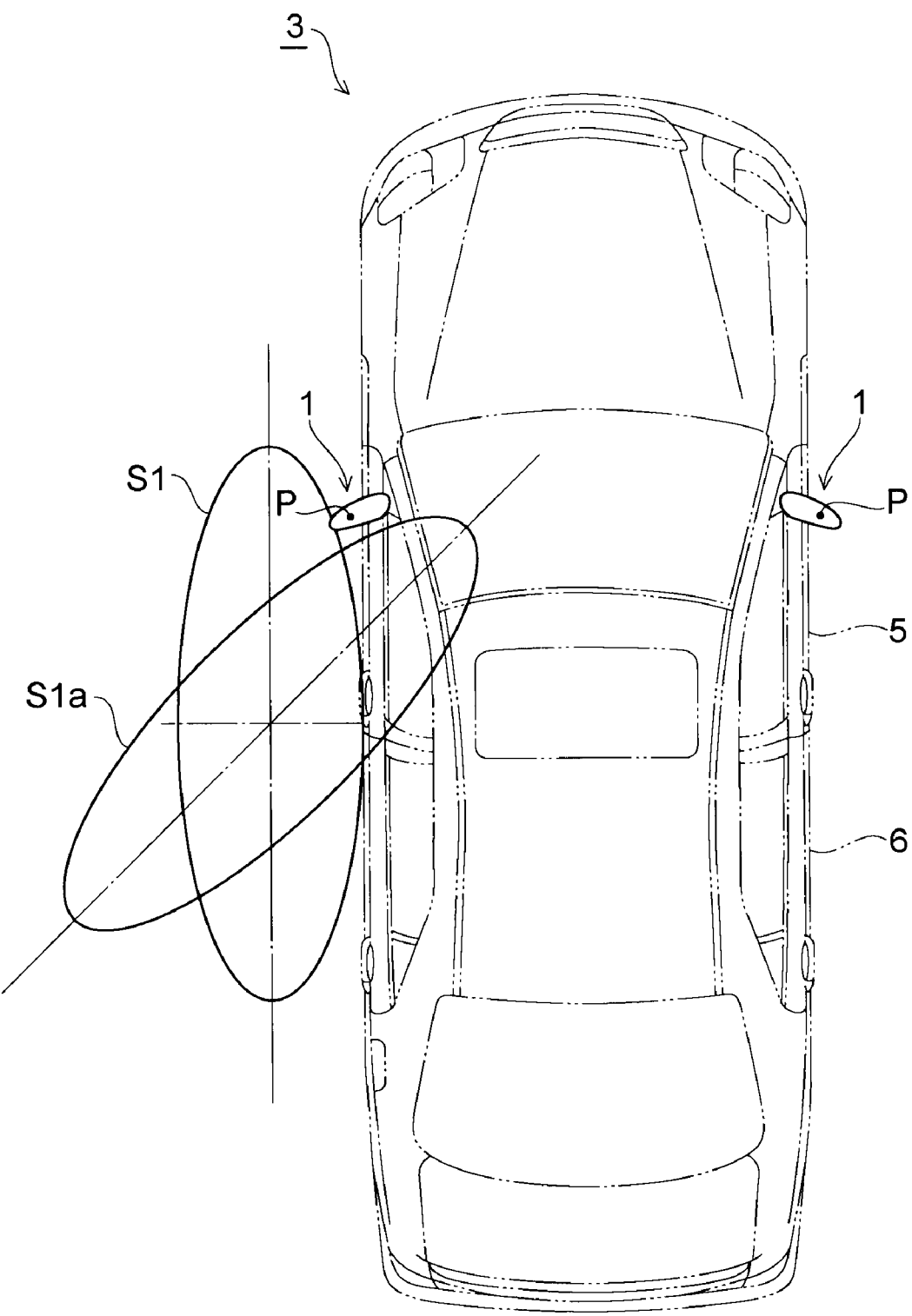
FIG. 1 is a plane view showing a vehicle to which a first embodiment of a door mirror according to the present invention is applied.

EXPLANATION OF REFERENCE NUMERALS 1, 35, 40, 45, 50, 55, 60 . . . Door mirror
3, 38, 43, 48, 53, 58, 63 . . . Vehicle
5, 6 . . . Door
7 . . . Door mirror body
27 . . . Lamp
28 . . . Lamp window
30, 36, 41, 46, 51, 56, 61 . . . Reflector
31, 37, 42, 47, 52, 57, 62 . . . Mirror surface
52a, 57a, 62a . . . Secondary reflecting surface
S1 to S7 . . . Light distribution

BEST MODES FOR CARRYING OUT THE INVENTION

Preferred embodiments of the door mirror according to the present invention are now described hereinafter in detail with reference to the drawings.

Figure 2:
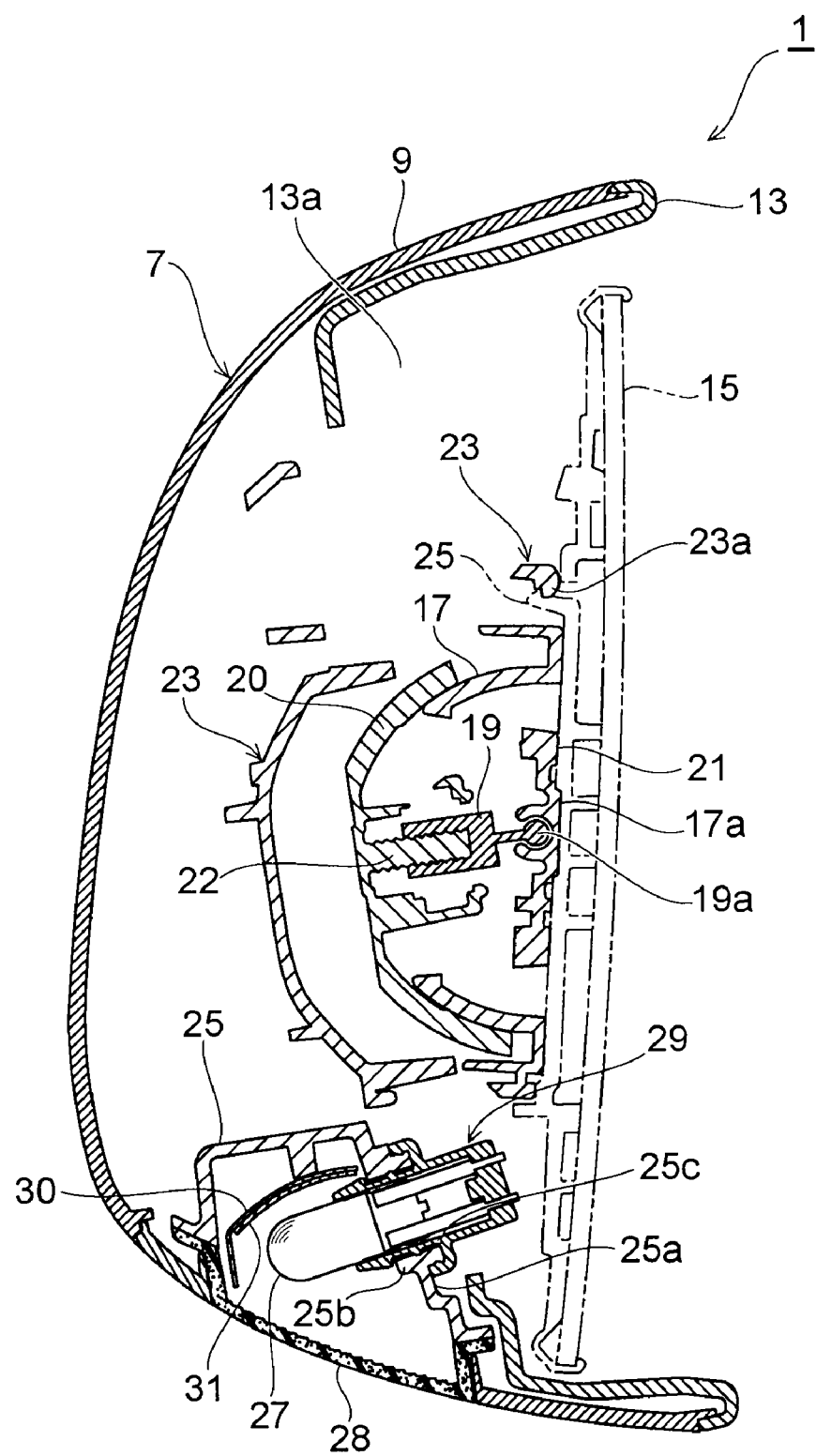
FIG. 2 is a cross-sectional view showing the first embodiment of the door mirror according to the present invention.

As shown in FIGS. 1 and 2, a door mirror 1 that is fixed to a front door 5 of a vehicle 3 has a door mirror body 7 made of resin, and this cup-shaped door mirror body 7 has a casing 9 having an opening part opened to a rear part side of the vehicle 3, and a cup-shaped partition plate 13 fixed to the casing 9 so as to be fitted into the opening part of the casing 9.

A reflecting mirror 15 is disposed on the door mirror 1 to close a concave part 13a provided on the partition plate 13. The reflecting mirror 15 is detachable with respect to a pivot plate 17 that is described hereinafter.

The pivot plate 17 has a circular plate part 21 abutted on a back surface of the reflecting mirror 15 and four retaining parts 23 disposed at regular intervals on an outer circumferential part of the circular plate part 21. Four pawl pieces 25 made of resin and provided on the back surface of the reflecting mirror 15 are hooked on a rod part 23a provided in each of the retaining parts 23. Hooking each of the pawl pieces 25 of the reflecting mirror 15 to the rod part 23a of the retaining part 23 can detachably mount the reflecting mirror 15 to the pivot plate 17, and strongly pulling the reflecting mirror 15 can release the reflecting mirror 15 from the pivot plate 17.

Moreover, aspherical concave parts 17a are formed in two sections on a back surface of the pivot plate 17. Ball parts 19a provided in head parts of adjuster nuts 19 are coupled to the concave parts 17a, respectively, by a ball joint structure. The adjuster nuts 19 are screwed into two adjust bolts 22 that are arranged in a cup-shaped holder 20 in a standing manner, and are moved in an axial direction independently while rotating by means of an actuator (not shown) having a combination of a motor and a gear. The inclination angle of the pivot plate 17 can be changed by changes in the amount of independent movement of each adjuster nut 19, whereby the mirror specular angle of the reflecting mirror 15 is changed to a predetermined mirror specular angle.

The actuator and the holder 20 are fixed to an internal frame 23 mounted in the casing 9. A lamp housing 25 is formed in a lower part of the internal frame 23. A rising wall 25a provided in the lamp housing 25 is provided with a lamp attachment opening part 25c for communicating the inside and outside of the lamp housing 25, and this opening part 25c is formed at an outer end of a cylinder part 25b projecting to the reflecting mirror 15 side. A lamp 27 is inserted from the opening part 25c of the cylinder part 25b, and a lamp socket 29 attached to a rear part of the lamp 27 is configured to be detachable with respect to the cylinder part 25b. Therefore, the lamp 27 can be replaced even when filament breakage occurs.

In order to effectively use light, the lamp housing 25 contains a reflector 30 for reflecting light emitted from the lamp 27 toward a lamp window 28. Therefore, when an occupant opens the front door 5, the area around the occupant's feet outside the front door 5 can be effectively illuminated by indirect lighting from the reflector 30 and direct lighting from the lamp 27. Note that an aluminized or chromed mirror surface 31 is formed only on a main surface side of the reflector 30.

The reflector 30 is an aspherical mirror in which spread of reflected light in a longitudinal direction of the vehicle 3 is larger than spread of reflected light in a lateral direction of the vehicle 3.

As described above, the light distribution expanded in the longitudinal direction of the vehicle 3 makes the light less likely to impinge on the side surface of the door of the vehicle 3, so that the rear part of the vehicle 3 can be illuminated efficiently. As a result, maximum illumination can be achieved with the minimum amount of light. In addition, because the range of illumination is long in the longitudinal direction, not only the area around the feet outside the front door 5 but also an area around the feet outside a rear door 6 can be illuminated easily.

Figure 3A:
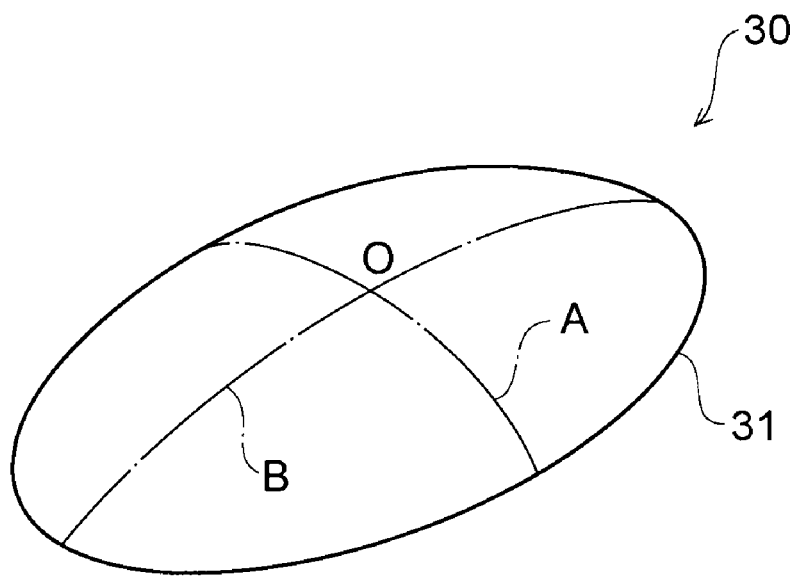
FIG. 3 is a diagram showing a mirror surface according to the first embodiment.
Figure 3B:
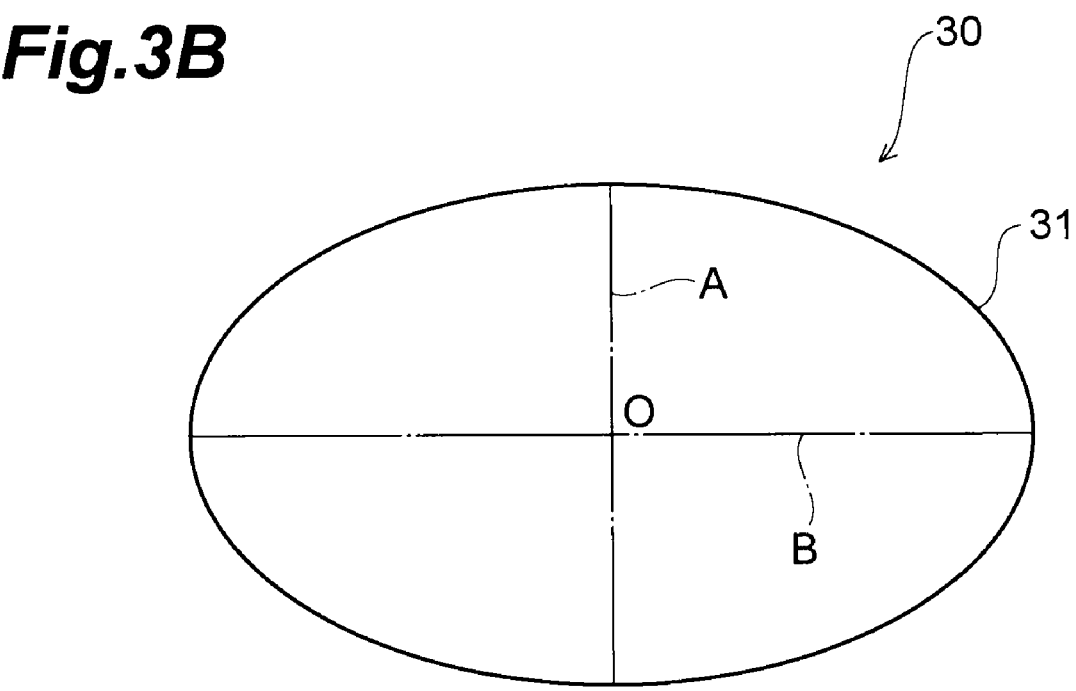
Figure 4A:
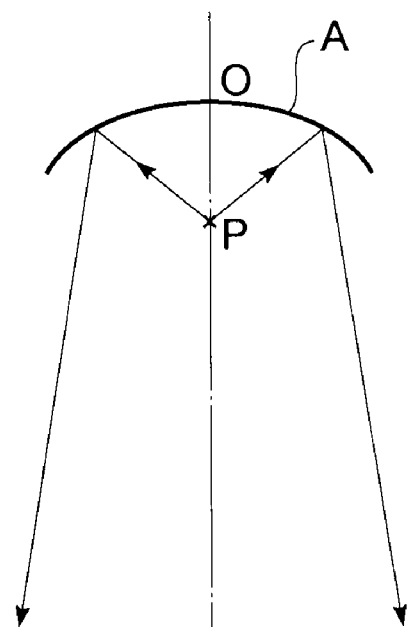
FIG. 4 is a schematic diagram showing a state in which light is reflected by the mirror surface shown in FIG. 3.
Figure 4B:
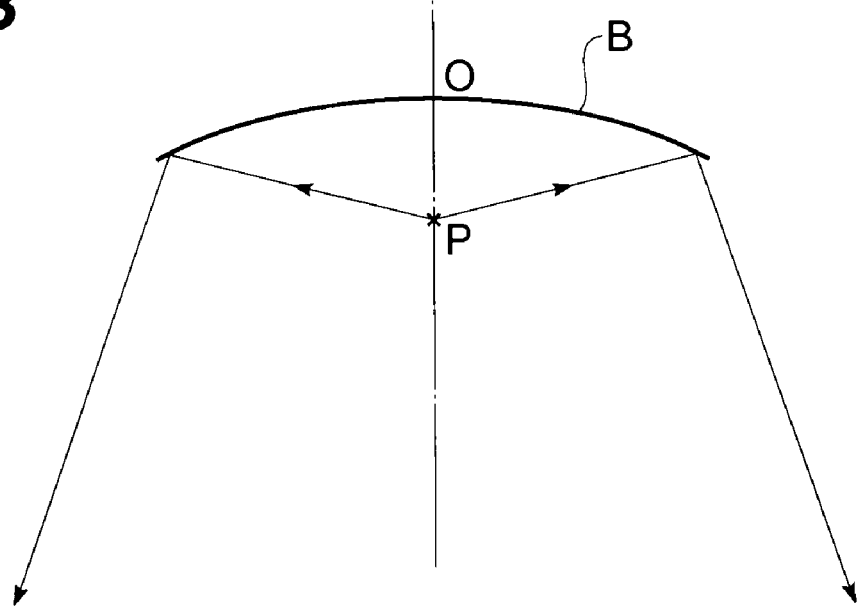

As shown in FIG. 3, the mirror surface 31 of the reflector 30 is configured into a concave mirror having an elliptical contour, in which a short axis line A and long axis line B intersect with each other at right angles at a central point (intersection) O, the short axis line A and long axis line B forming parabolas. Therefore, the mirror surface 31 is formed into a paraboloidal surface. FIG. 3A is a perspective view in which the mirror surface is viewed from its back surface, and FIG. 3B a diagram in which the mirror surface is viewed from its main surface. As shown in FIG. 4, when a luminous point P of the lamp 27 is disposed directly below the central point O, the light reflected by the mirror surface 31 expands wider on the long axis line B side than on the short axis line A side.

Due to the reflection property of the mirror surface 31 shown in FIG. 4, the mirror surface 31 is disposed within the lamp housing 25 such as to align the longitudinal direction of the vehicle 3 with the long axis line B of the mirror surface 31. As a result, a light distribution shown by S1 in FIG. 1 is obtained. As shown by a light distribution S1a, the long axis line B of the mirror surface 31 may be inclined 45 degrees in the horizontal direction on the basis of the longitudinal direction of the vehicle 3. This inclination angle may preferably be in the range of 0 to 45 degrees.

Next, various modifications of the reflector configured by an aspherical mirror are described.

(Modification 1)

Figure 5:
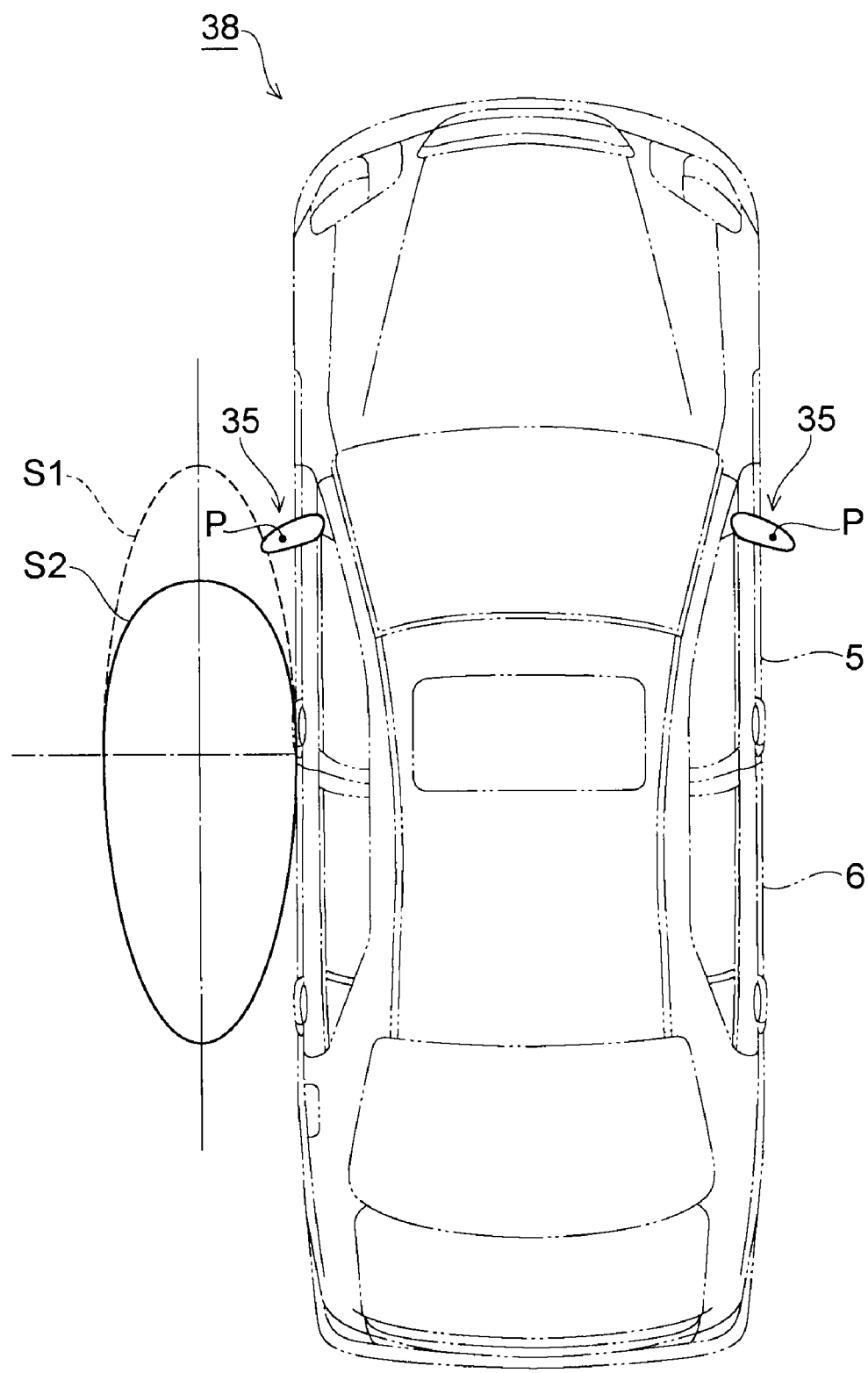
FIG. 5 is a plane view showing a vehicle to which a mirror surface according to modification 1 is applied.
Figure 6A:
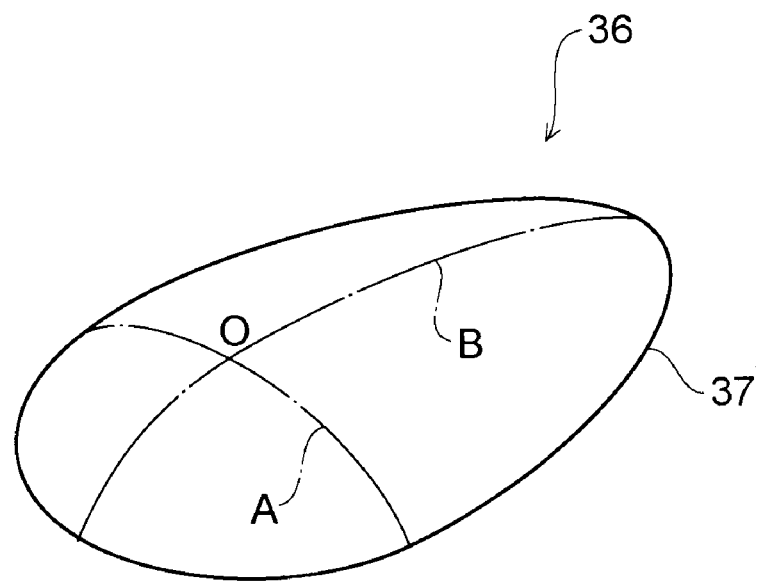
FIG. 6 is a diagram showing the mirror surface according to modification 1.
Figure 6B:
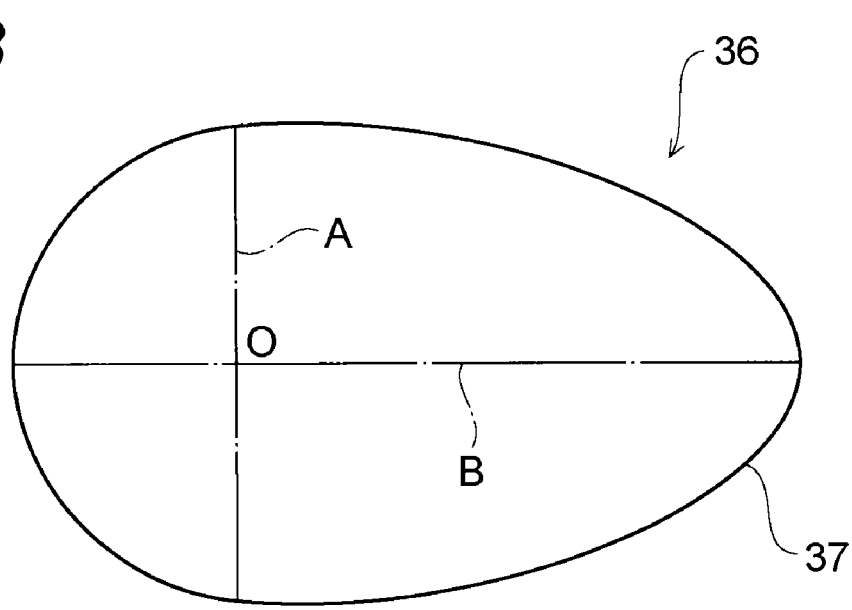
Figure 7A:
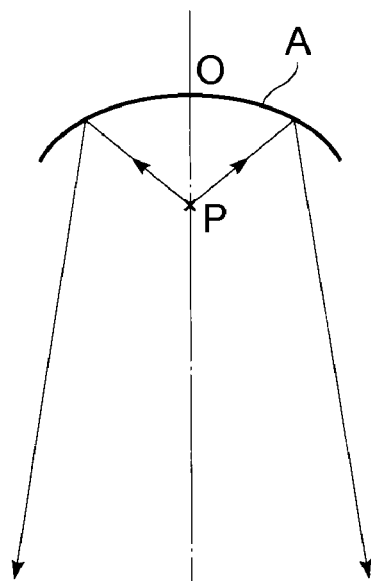
FIG. 7 is a schematic diagram showing a state in which light is reflected by the mirror surface shown in FIG. 6.
Figure 7B:
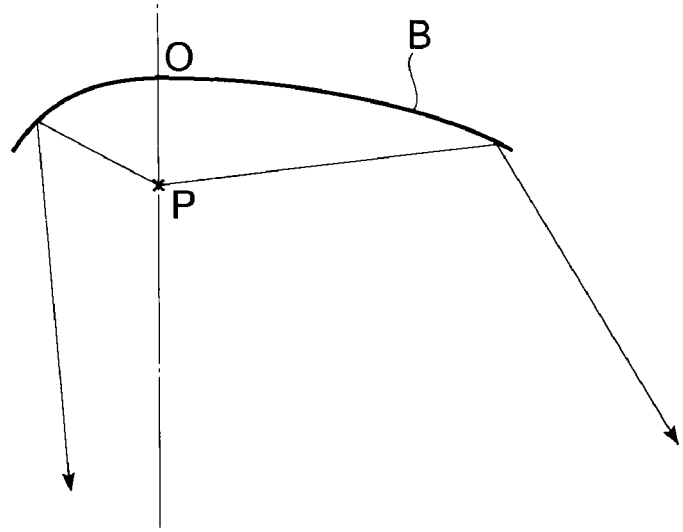

As shown in FIGS. 5 to 7, a mirror surface 37 of a reflector 36 on a door mirror 35 is configured by a concave mirror having an oval-shaped or teardrop-shaped contour, in which the short axis line A intersects with the long axis line B at right angles at the intersection O, the short axis line A and long axis line B forming parabolas. Therefore, the mirror surface 31 is formed into a paraboloidal surface. The short axis line A is shifted to one end of the long axis line B. FIG. 6A is a perspective view in which the mirror surface is viewed from its back surface, and FIG. 6B a diagram in which the mirror surface is viewed from its main surface. As shown in FIG. 7, when the luminous point P of the lamp 27 is disposed directly below the intersection O, the light reflected by the mirror surface 31 expands wider on the long axis line B side than on the short axis line A side. In addition, as shown in FIG. 7B, the curvature radius on the left-hand side of the intersection O on the long axis line B is smaller than the curvature radius on the right-hand side. Therefore, the light reflected by the left-hand side surface is directed toward the right-hand side.

Due to the reflection property of the mirror surface 37 shown in FIG. 7, the mirror surface 37 is disposed within the lamp housing 25 such as to align the longitudinal direction of a vehicle 38 with the long axis line B of the mirror surface 37. At this moment, the short axis line A is disposed on the front side. As a result, a light distribution shown by S2 in FIG. 5 is obtained, and the rear side distant from an area directly below the door mirror 35 can be securely illuminated. This configuration is effective when foot lighting does not have to be provided to the ground directly below the door mirror 35.

(Modification 2)

Figure 8:
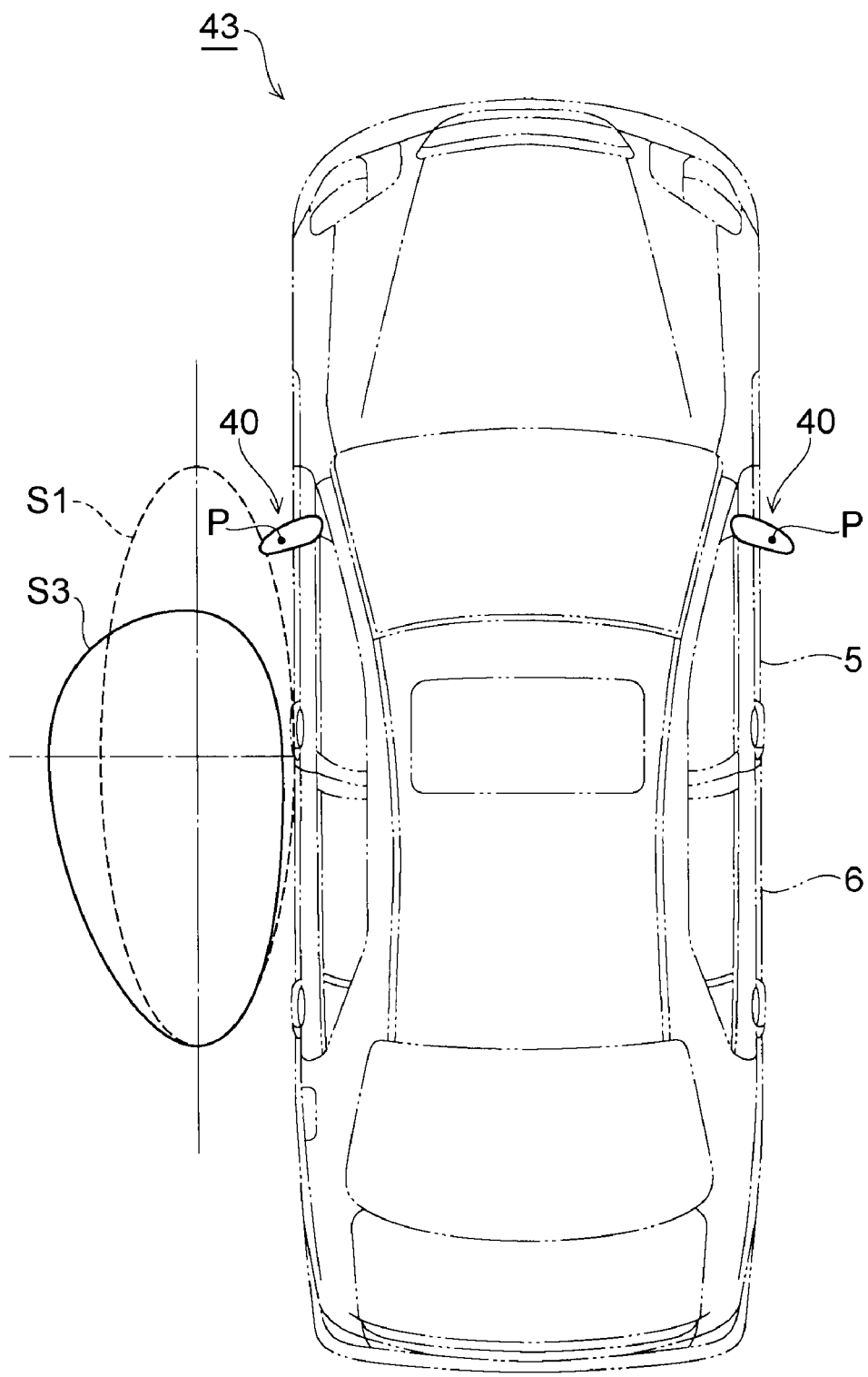
FIG. 8 is a plane view showing a vehicle to which a mirror surface according to modification 2 is applied.
Figure 9A:
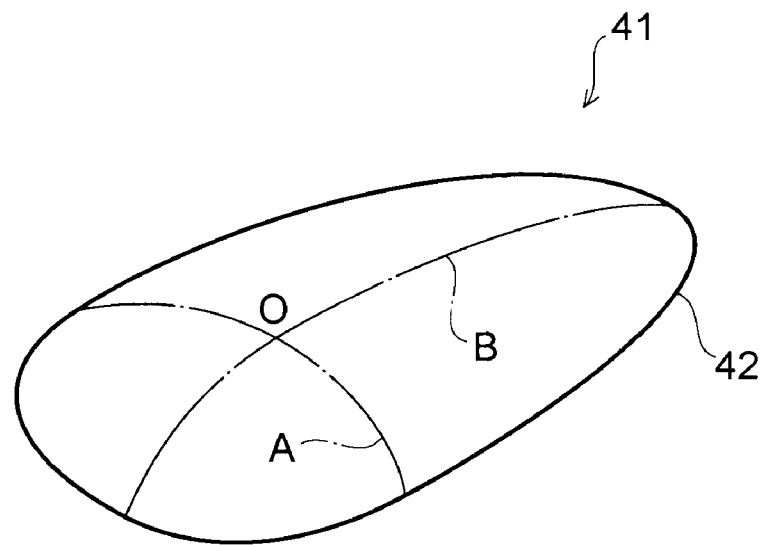
FIG. 9 is a diagram showing the mirror surface according to modification 2.
Figure 9B:
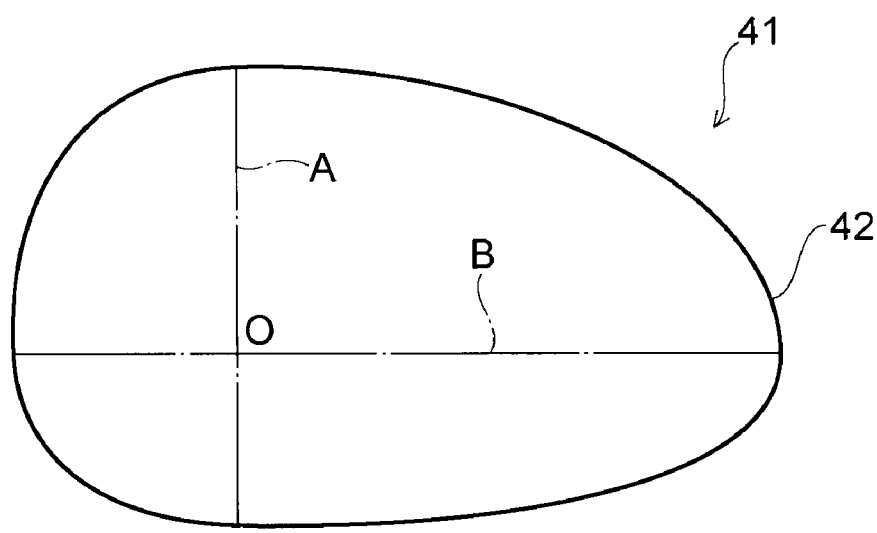

As shown in FIGS. 8 to 10, a mirror surface 42 of a reflector 41 on a door mirror 40 is configured by a concave mirror having a deformed oval-shaped or teardrop-shaped contour, in which the short axis line A intersects with the long axis line B at right angles at the intersection O, the short axis line A and long axis line B forming parabolas. Therefore, the mirror surface 42 is formed into a paraboloidal surface. The short axis line A is shifted to one end of the long axis line B, and the long axis line B is also shifted to one end of the short axis line A. FIG. 9A is a perspective view in which the mirror surface is viewed from its back surface, and FIG. 9B a diagram in which the mirror surface is viewed from its main surface. As shown in FIG. 10, when the luminous point P of the lamp 27 is disposed directly below the intersection O, the light reflected by the mirror surface 42 expands wider on the long axis line B side than on the short axis line A side.

Figure 10A:
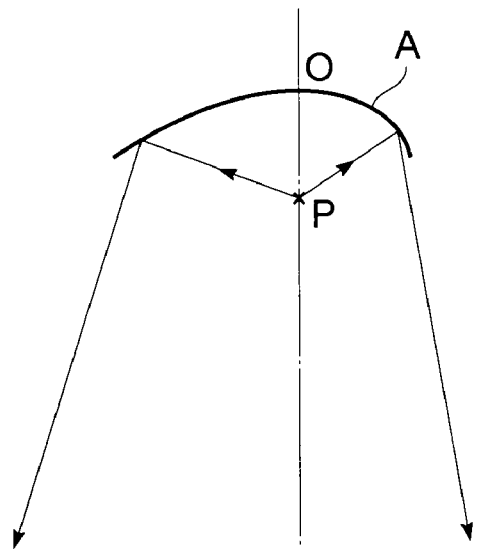
FIG. 10 is a schematic diagram showing a state in which light is reflected by the mirror surface shown in FIG. 9.
Figure 10B:
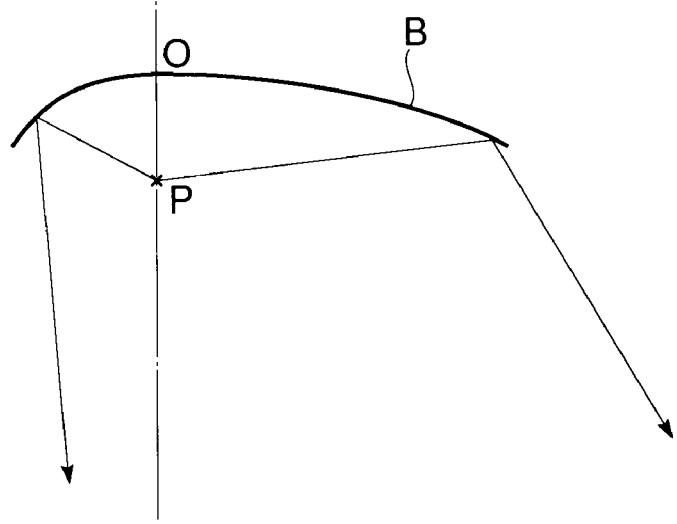

In addition, as shown in FIG. 10A, the curvature radius on the left-hand side of the intersection O on the short axis line A is greater than the curvature radius on the right-hand side. The light reflected by the right-hand side surface is directed toward the right-hand side at an open angle smaller than that of the left-hand side surface. Moreover, as shown in FIG. 10B, the curvature radius on the left-hand side of the intersection O on the long axis line B is smaller than the curvature radius on the right-hand side. Therefore, the light reflected by the left-hand side surface is directed toward the right-hand side.

Due to the reflection property of the mirror surface 42 shown in FIG. 10, the mirror surface 37 is disposed within the lamp housing 25 such as to align the longitudinal direction of a vehicle 43 with the long axis line B of the mirror surface 37. At this moment, the short axis line A is disposed on the front side, while the long axis line B is disposed near the door 5 side. As a result, a light distribution shown by S3 in FIG. 8 is obtained, and not only is it possible to illuminate a position slightly distant from the doors 5, 6, but also to securely illuminate the rear side distant from an area directly below the door mirror 40. This configuration is effective when foot lighting does not have to be provided to the ground directly below the door mirror 40 as well as the doors 5, 6 themselves.

(Modification 3)

Figure 11:
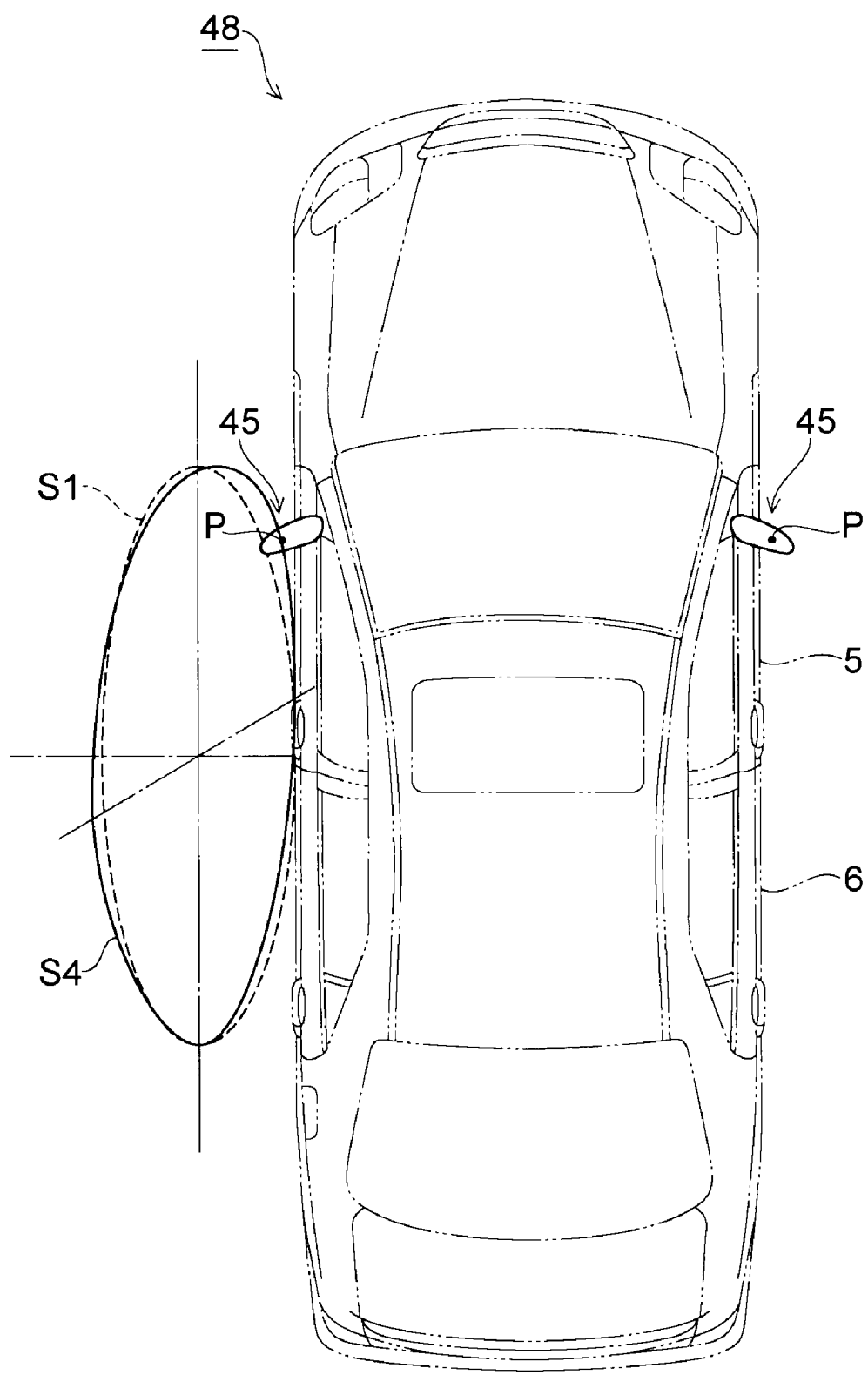
FIG. 11 is a plane view showing a vehicle to which a mirror surface according to modification 3 is applied.
Figure 12A:
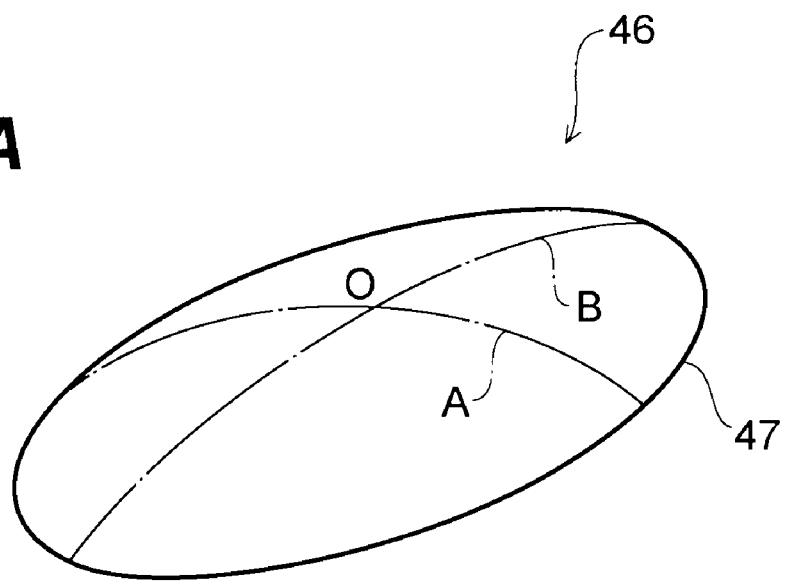
FIG. 12 is a diagram showing the mirror surface according to modification 3.
Figure 12B:
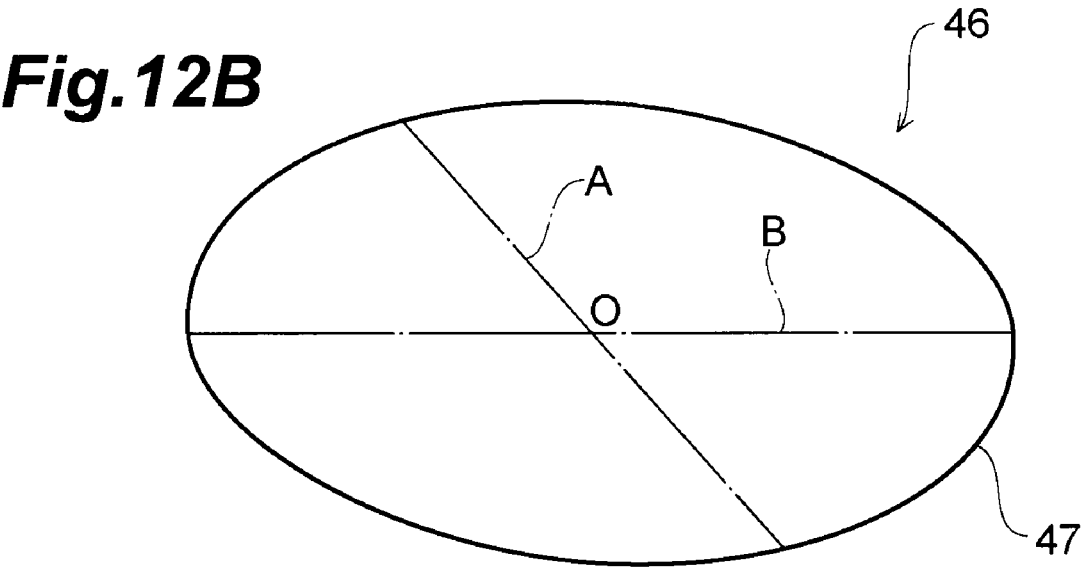
Figure 13A:
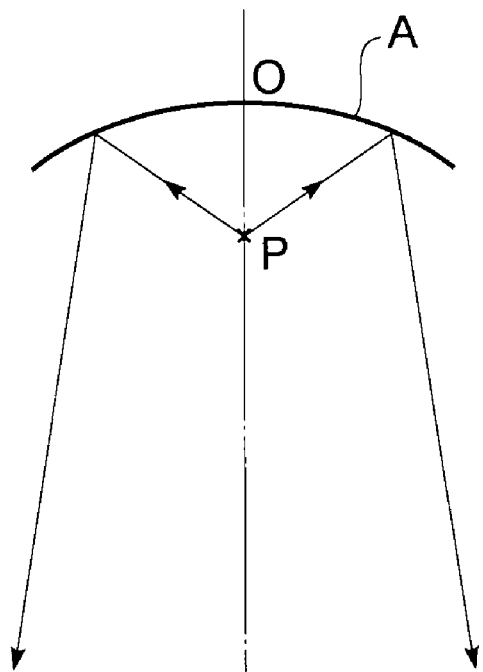
FIG. 13 is a schematic diagram showing a state in which light is reflected by the mirror surface shown in FIG. 12.
Figure 13B:
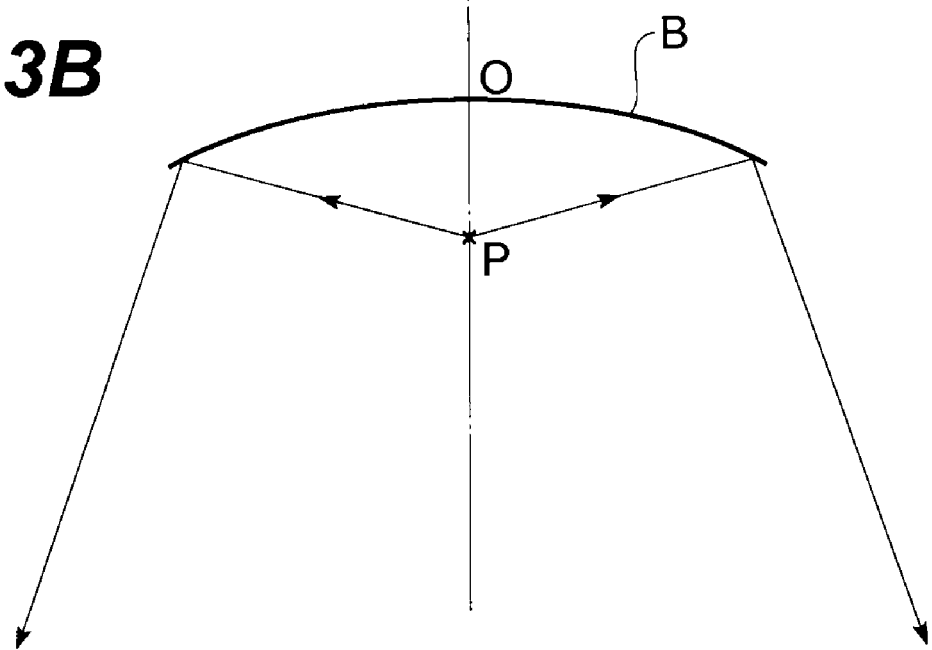

As shown in FIGS. 11 to 13, a mirror surface 47 of a reflector 46 on a door mirror 45 is configured by a concave mirror having a deformed elliptical contour, in which the short axis line A intersects with the long axis line B at an angle other than 90 degrees at the intersection 0, the short axis line A and long axis line B forming parabolas. Therefore, the mirror surface 47 is formed into a paraboloidal surface. FIG. 12A is a perspective view in which the mirror surface is viewed from its back surface, and FIG. 12B a diagram in which the mirror surface is viewed from its main surface. As shown in FIG. 13, when the luminous point P of the lamp 27 is disposed directly below the intersection O, the light reflected by the mirror surface 47 expands wider on the long axis line B side than on the short axis line A side.

Due to the reflection property of the mirror surface 47 shown in

FIG. 13, the mirror surface 47 is disposed within the lamp housing 25 such as to align the longitudinal direction of a vehicle 48 with the long axis line B of the mirror surface 47. As a result, a light distribution shown by S4 in FIG. 11 is obtained.

(Modification 4)

Figure 14:
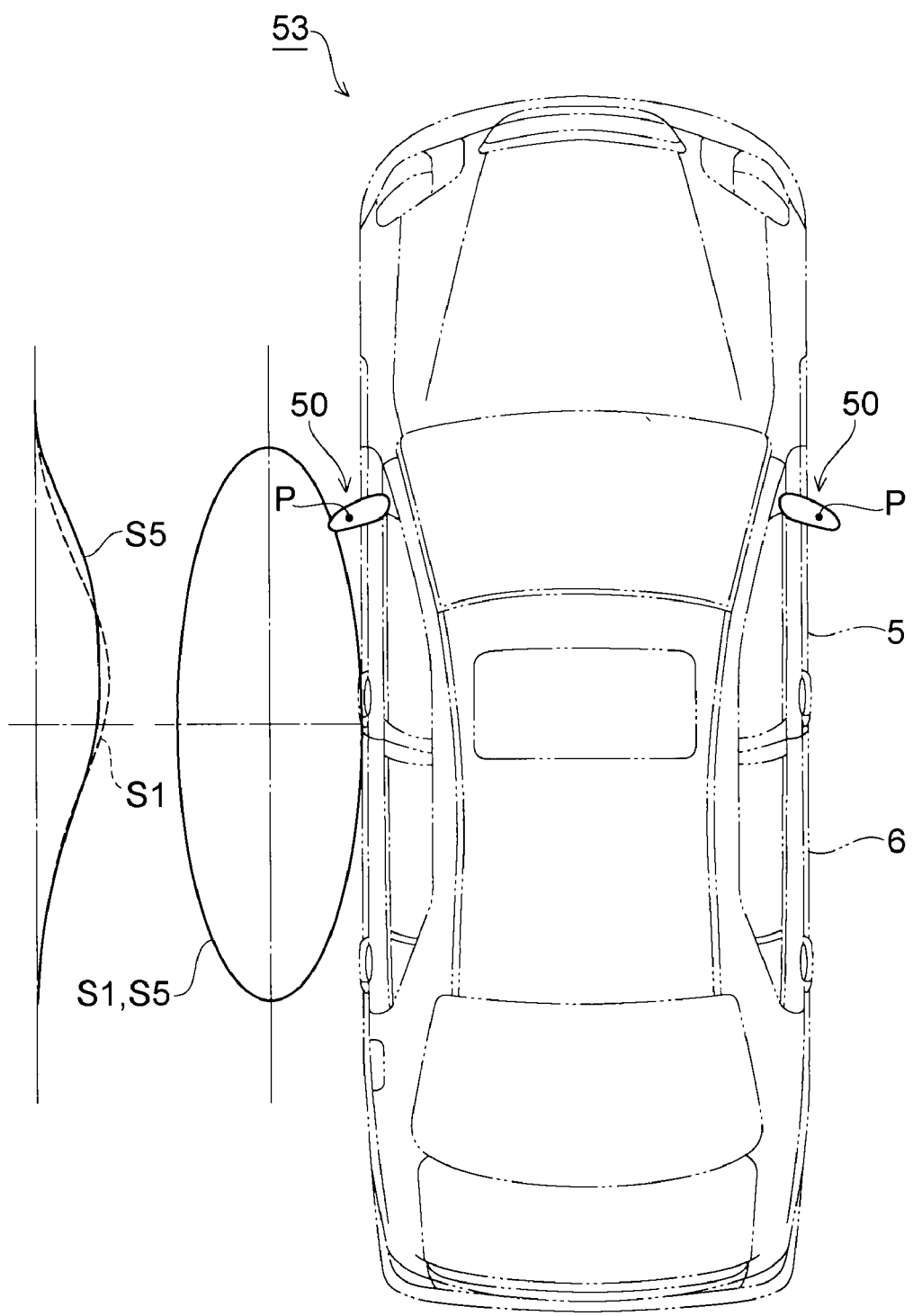
FIG. 14 is a plane view showing a vehicle to which a mirror surface according to modification 4 is applied.
Figure 15A:
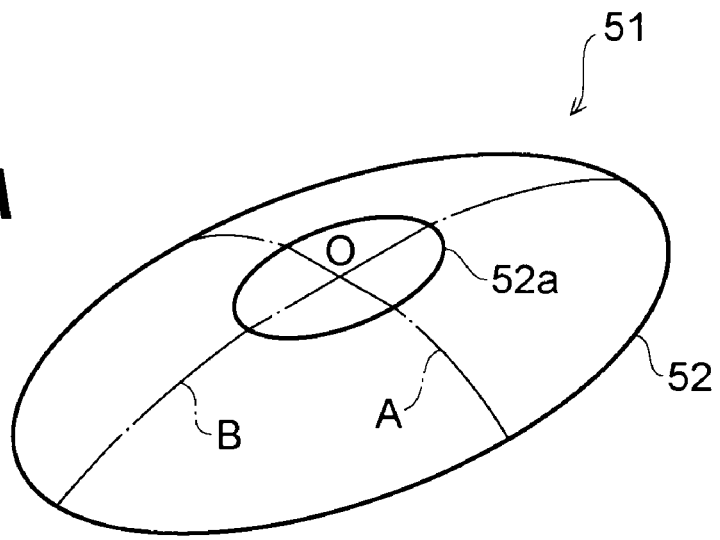
FIG. 15 is a diagram showing the mirror surface according to modification 4.
Figure 15B:
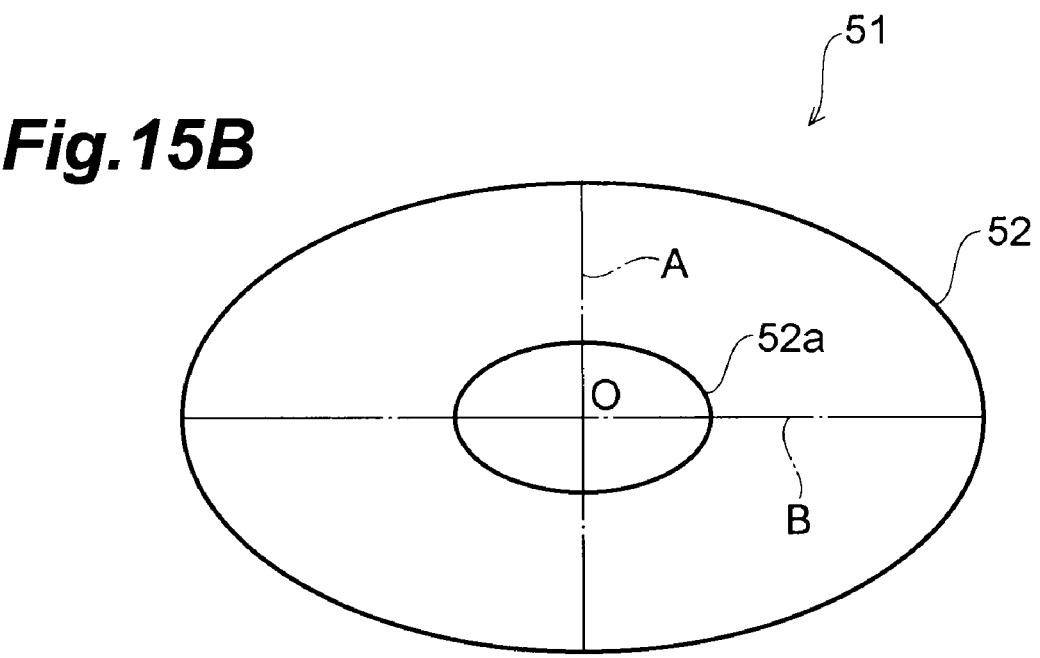
Figure 16A:
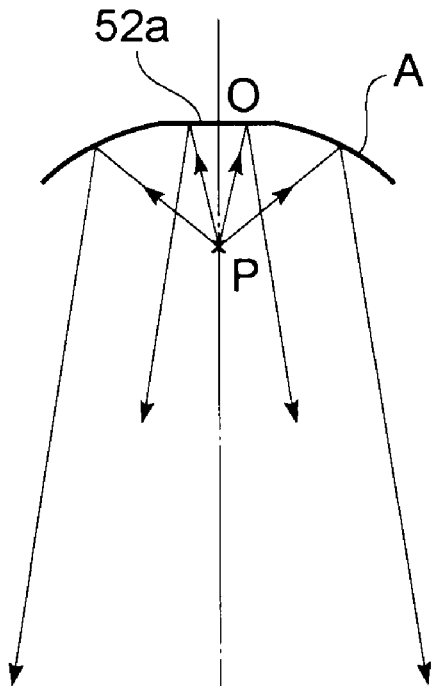
FIG. 16 is a schematic diagram showing a state in which light is reflected by the mirror surface shown in FIG. 15.
Figure 16B:
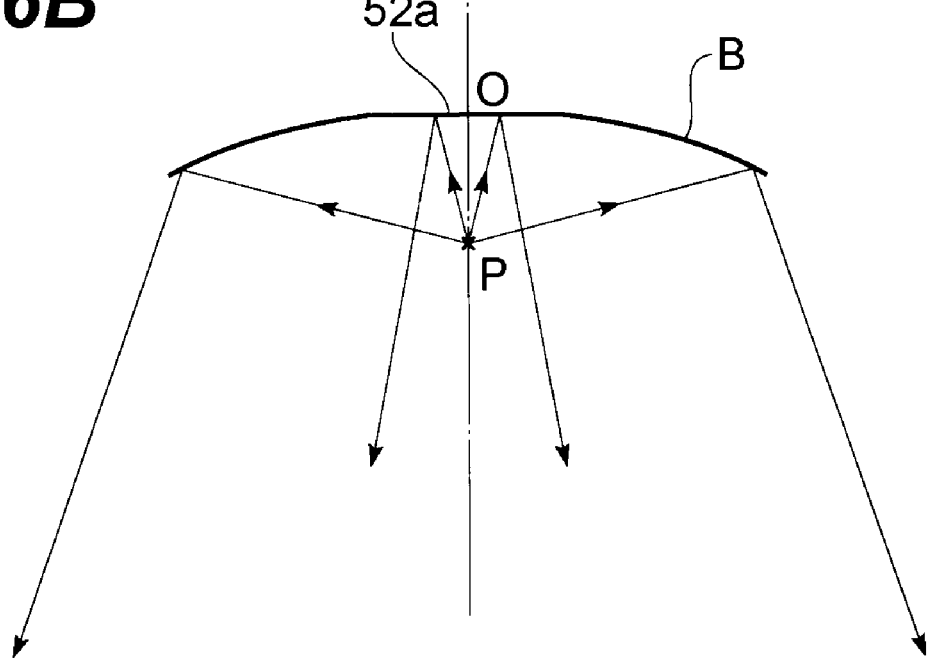

As shown in FIGS. 14 to 16, a mirror surface 52 of a reflector 51 on a door mirror 50 is configured by a concave mirror having an elliptical contour, in which the short axis line A intersects with the long axis line B at the intersection O, the short axis line A and long axis line B forming parabolas. Therefore, the mirror surface 52 is formed into a paraboloidal surface. Moreover, the top of the mirror surface 52 is provided with a planar secondary reflecting surface 52a. This secondary reflecting surface 52a has an elliptical contour. FIG. 15A is a perspective view in which the mirror surface is viewed from its back surface, and FIG. 15B a diagram in which the mirror surface is viewed from its main surface. As shown in FIG. 16, when the luminous point P of the lamp 27 is disposed directly below the intersection O, the light reflected by the mirror surface 52 expands wider on the long axis line B side than on the short axis line A side. The light reflected by the secondary reflecting surface 52a expands evenly.

Due to the reflection property of the mirror surface 52 shown in FIG. 16, the mirror surface 52 is disposed within the lamp housing 25 such as to align the longitudinal direction of a vehicle 53 with the long axis line B of the mirror surface 52. As a result, a light distribution shown by S5 in FIG. 14 is obtained. In this case, the illuminance peak of the light distribution S5 is lower than that of S1, and uniform illuminance is obtained in the vicinity of the center.

(Modification 5)

Figure 17:
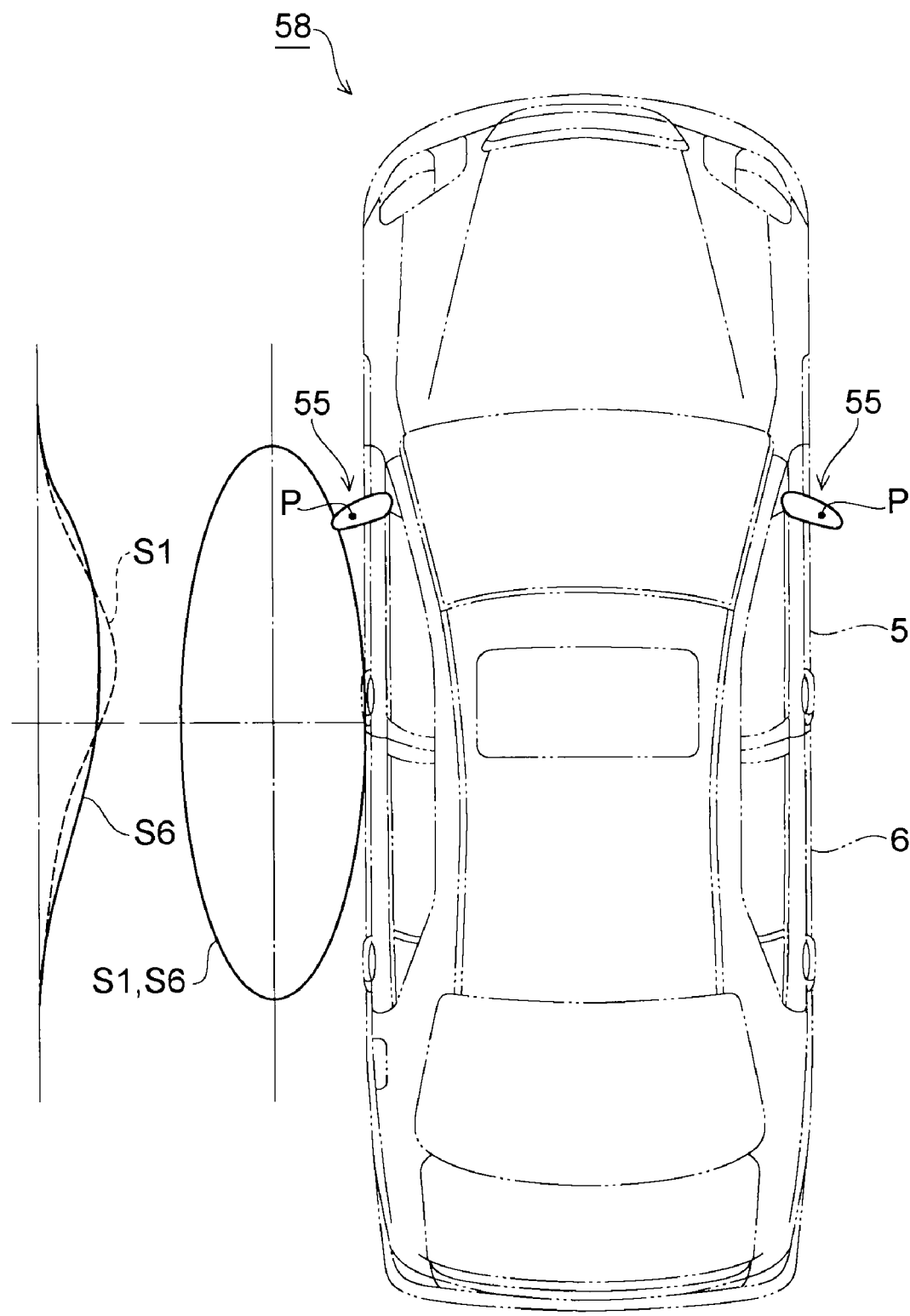
FIG. 17 is a plane view showing a vehicle to which a mirror surface according to modification 5 is applied.
Figure 18A:
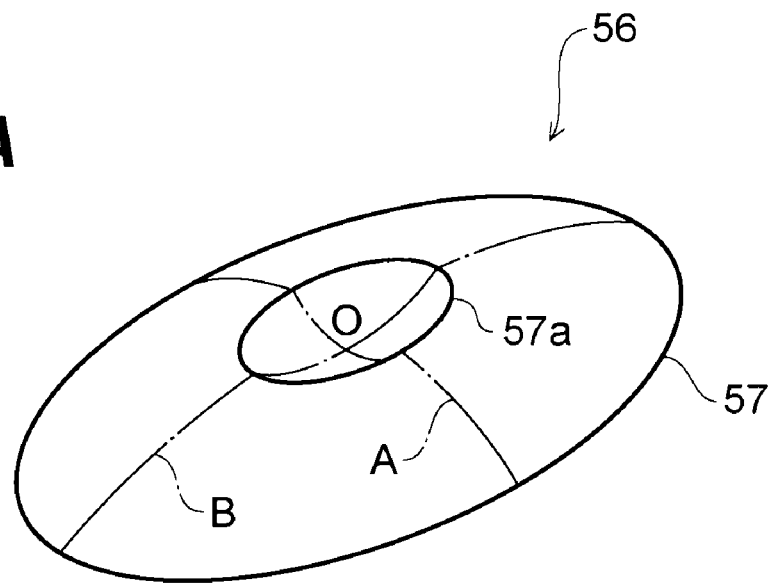
FIG. 18 is a diagram showing the mirror surface according to modification 5.
Figure 18B:
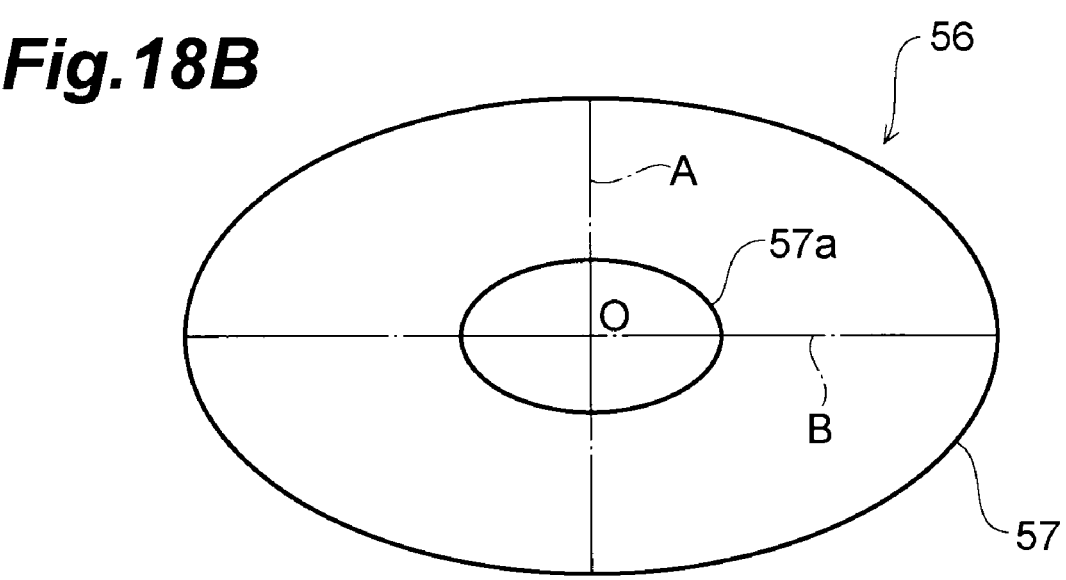
Figure 19A:
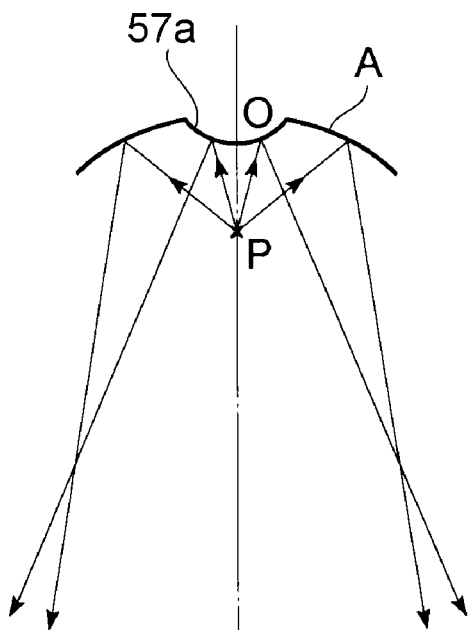
FIG. 19 is a schematic diagram showing a state in which light is reflected by the mirror surface shown in FIG. 18.
Figure 19B:
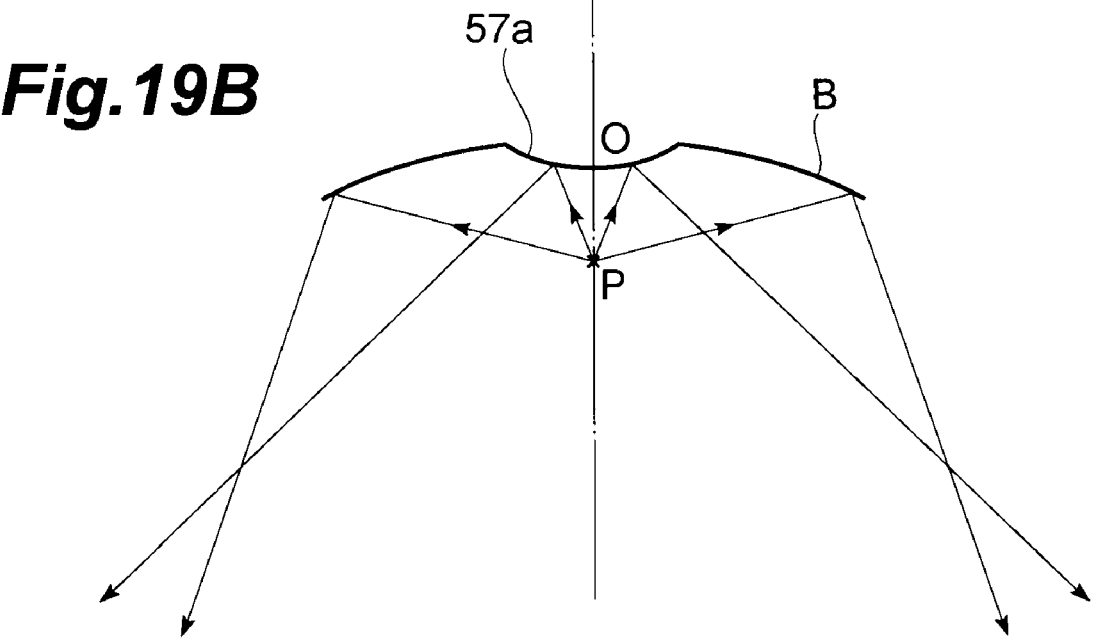

As shown in FIGS. 17 to 19, a mirror surface 57 of a reflector 56 on a door mirror 55 is configured by a concave mirror having an elliptical contour, in which the short axis line A intersects with the long axis line B at the intersection O, the short axis line A and long axis line B forming parabolas. Therefore, the mirror surface 57 is formed into a paraboloidal surface. Moreover, the top of the mirror surface 57 is provided with a convex secondary reflecting surface 57a. This secondary reflecting surface 57a has an elliptical contour. FIG. 18A is a perspective view in which the mirror surface is viewed from its back surface, and FIG. 18B a diagram in which the mirror surface is viewed from its main surface. As shown in FIG. 19, when the luminous point P of the lamp 27 is disposed directly below the intersection O, the light reflected by the mirror surface 57 expands wider on the long axis line B side than on the short axis line A side. The light reflected by the secondary reflecting surface 57a expands outward.

Due to the reflection property of the mirror surface 57 shown in FIG. 19, the mirror surface 57 is disposed within the lamp housing 25 such as to align the longitudinal direction of a vehicle 58 with the long axis line B of the mirror surface 57. As a result, a light distribution shown by S6 in FIG. 17 is obtained. In this case, the illuminance peak of the light distribution S6 is lower than that of S1, and uniform illuminance is obtained in the vicinity of the center.

(Modification 6)

Figure 20:
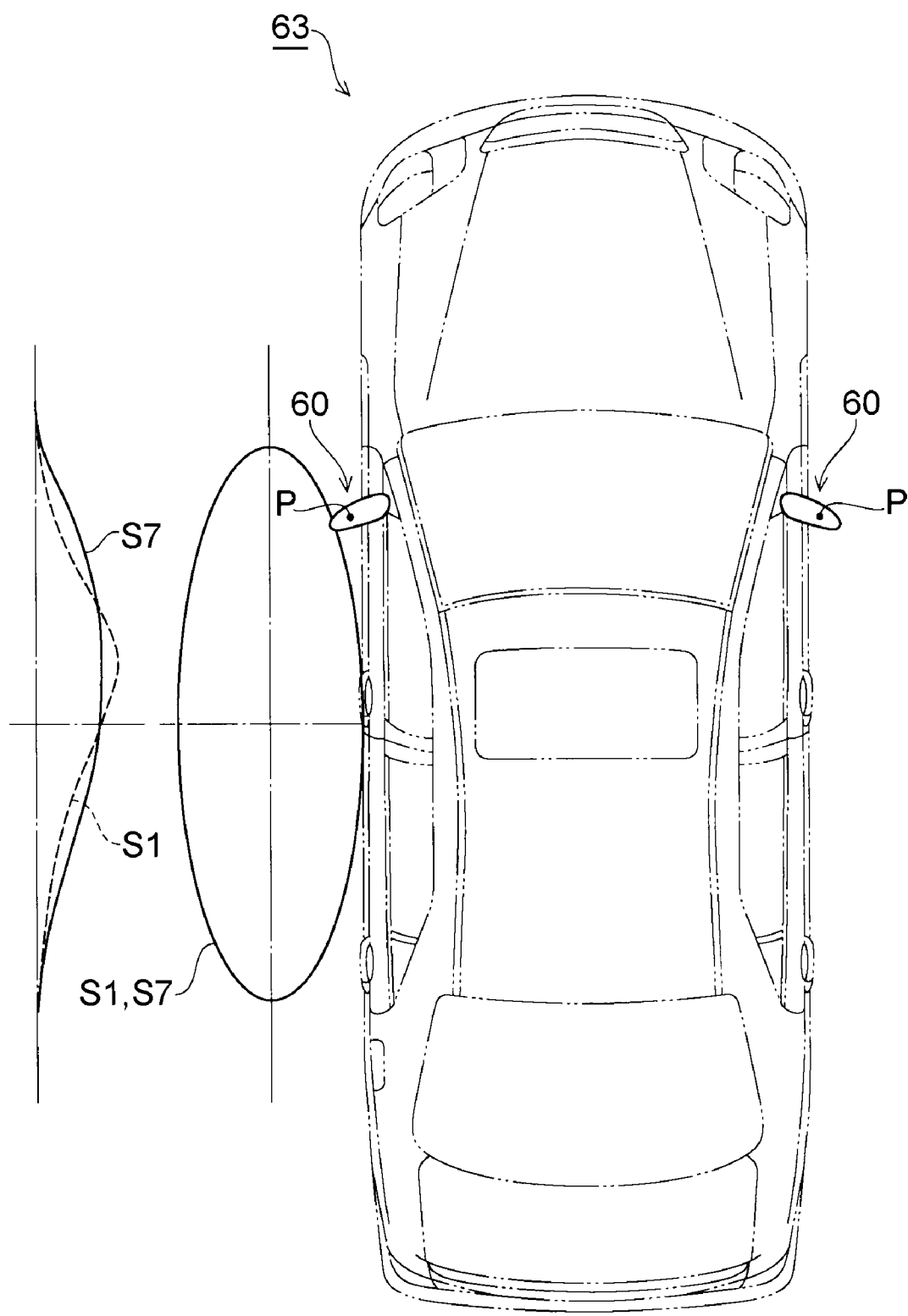
FIG. 20 is a plane view showing a vehicle to which a mirror surface according to modification 6 is applied.
Figure 21A:
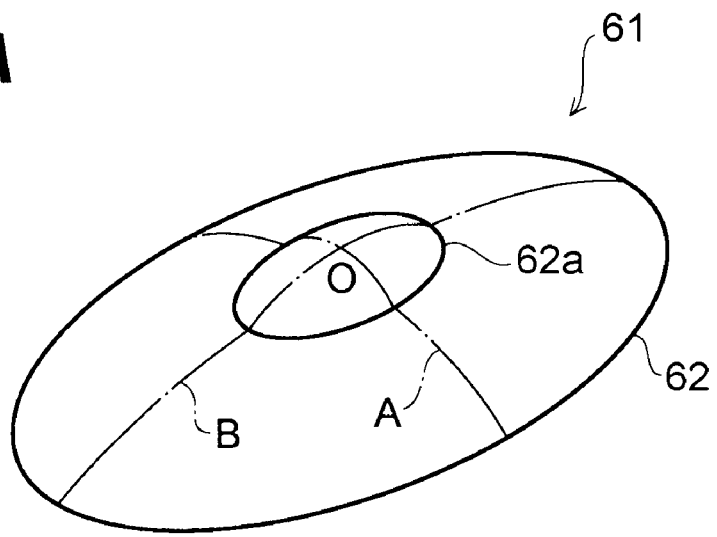
FIG. 21 is a diagram showing the mirror surface according to modification 6.
Figure 21B:
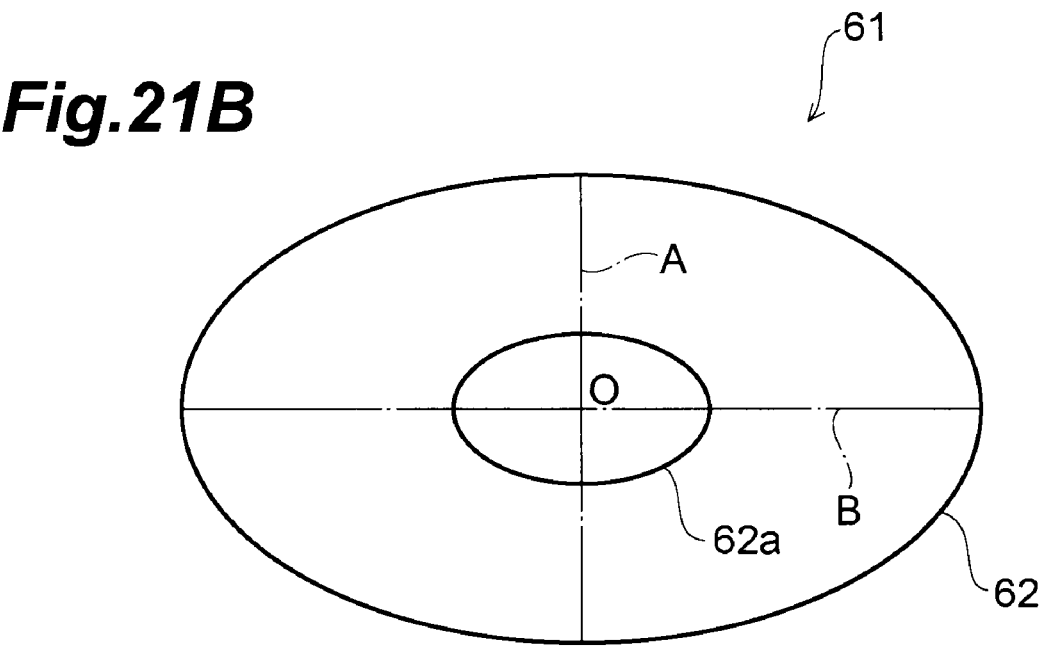
Figure 22A:
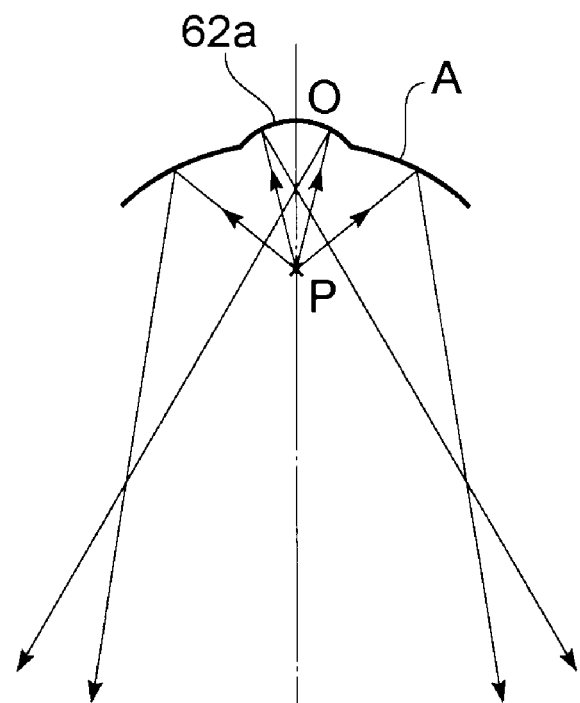
FIG. 22 is a schematic diagram showing a state in which light is reflected by the mirror surface shown in FIG. 21.
Figure 22B:
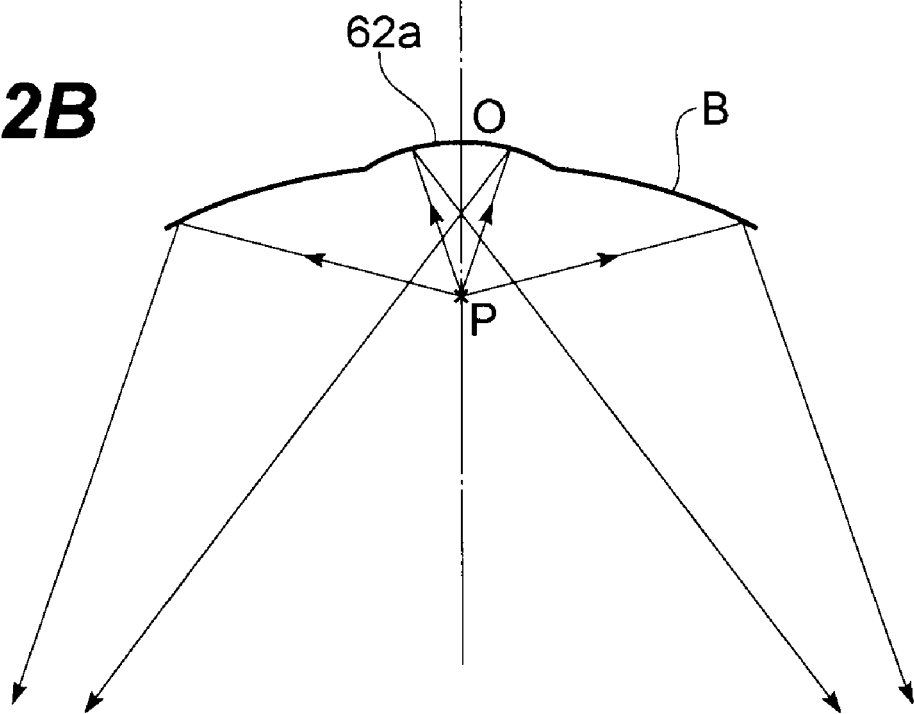

As shown in FIGS. 20 to 22, a mirror surface 62 of a reflector 61 on a door mirror 60 is configured by a concave mirror having an elliptical contour, in which the short axis line A intersects with the long axis line B at the intersection O, the short axis line A and long axis line B forming parabolas. Therefore, the mirror surface 62 is formed into a paraboloidal surface. Moreover, the top of the mirror surface 62 is provided with a concave secondary reflecting surface 62a. This secondary reflecting surface 62a has an elliptical contour. FIG. 21A is a perspective view in which the mirror surface is viewed from its back surface, and FIG. 21B a diagram in which the mirror surface is viewed from its main surface. As shown in FIG. 22, when the luminous point P of the lamp 27 is disposed directly below the intersection O, the light reflected by the mirror surface 62 expands wider on the long axis line B side than on the short axis line A side. The light reflected by the secondary reflecting surface 62a expands outward.

Due to the reflection property of the mirror surface 62 shown in FIG. 22, the mirror surface 62 is disposed within the lamp housing 25 such as to align the longitudinal direction of a vehicle 63 with the long axis line B of the mirror surface 62. As a result, a light distribution shown by S7 in FIG. 20 is obtained. In this case, the illuminance peak of the light distribution S7 is lower than that of S1, and uniform illuminance is obtained in the vicinity of the center.

INDUSTRIAL APPLICABILITY

The present invention provides a door mirror that securely illuminates an area around an occupant's feet while ensuring illuminance sufficient for checking the area around the feet outside a door when the occupant opens the door.

The invention claimed is:

1. A door mirror, comprising:
   a door mirror body fixed to a door of a vehicle and having a lamp housing;
   a lamp provided inside the lamp housing of the door mirror body;
   a lamp window provided on the lamp housing of the door mirror body; and
   a reflector disposed within the lamp housing of the door mirror body and positioned to reflect light emitted from the lamp toward the lamp window and illuminate an area around a foot of an occupant outside the door,
   wherein the reflector is an aspherical mirror having a mirror surface having a paraboloidal shape, the paraboloidal shape of the mirror surface is configured to form a light distribution in which spread of the light in a longitudinal direction of the vehicle is larger than spread of the light in a lateral direction of the vehicle, and the lamp is mounted on the lamp housing and positioned off the mirror surface of the aspherical mirror of the reflector.

2. The door mirror according to claim 1, wherein the paraboloidal shape of the mirror surface has a top portion provided with a planar, convex, or concave secondary reflecting surface.

3. The door mirror according to claim 1, wherein the paraboloidal shape of the mirror surface has a top portion provided with a planar secondary reflecting surface.

4. The door mirror according to claim 1, wherein the paraboloidal shape of the mirror surface has a top portion provided with a convex secondary reflecting surface.

5. The door mirror according to claim 1, wherein the paraboloidal shape of the mirror surface has a top portion provided with a concave secondary reflecting surface.

6. The door mirror according to claim 1, wherein the mirror surface of the aspherical mirror is a concave mirror having an oval-shaped contour.

7. The door mirror according to claim 1, wherein the mirror surface of the aspherical mirror is a concave mirror having a teardrop-shaped contour.

8. The door mirror according to claim 1, wherein the mirror surface of the aspherical mirror is a concave mirror having an oval-shaped contour, and the oval-shaped contour has a short axis line shifted to one end of a long axis line.

9. The door mirror according to claim 1, wherein the mirror surface of the aspherical mirror is a concave mirror having a deformed oval-shaped contour, and the deformed oval-shaped contour has a short axis line shifted to one end of a long axis line and the long axis line shifted to one end of the short axis line toward the door of the vehicle.

10. The door mirror according to claim 1, wherein the mirror surface of the aspherical mirror is a concave mirror having a deformed teardrop-shaped contour, and the deformed teardrop-shaped contour has a short axis line shifted to one end of a long axis line and the long axis line shifted to one end of the short axis line toward the door of the vehicle.

11. The door mirror according to claim 1, wherein the mirror surface of the aspherical mirror has a long axis line inclined at an angle of 45 degrees in the lateral direction of the vehicle.

12. The door mirror according to claim 1, wherein the mirror surface of the aspherical mirror has a long axis line inclined at an angle in a range of 0 to 45 degrees in the lateral direction of the vehicle.

13. The door mirror according to claim 1, wherein the mirror surface of the aspherical mirror is a concave mirror having a deformed elliptical contour, and the deformed elliptical contour has a short axis line intersects with a long axis line at an angle other than an angle of 90 degrees.

14. The door mirror according to claim 1, wherein the lamp housing of the door mirror body has a cylinder portion configured to receive a lamp socket for the lamp, and the cylinder portion of the lamp housing is projecting toward the mirror surface and has a lamp attachment opening through which the lamp is inserted.

15. The door mirror according to claim 1, wherein the lamp housing of the door mirror body has means for mounting a lamp socket for the lamp.

* * * * *